Nov. 2, 1965 E. I. LYNCH 3,215,770
QUADRATURE PHASE SPLITTING CIRCUIT
Filed Sept. 8, 1960

INVENTOR:
EDWARD I. LYNCH,
BY Joseph Levinson
HIS ATTORNEY.

3,215,770
QUADRATURE PHASE SPLITTING CIRCUIT
Edward I. Lynch, Syracuse, N.Y., assignor to General Electric Company, a corporation of New York
Filed Sept. 8, 1960, Ser. No. 54,801
4 Claims. (Cl. 178—5.4)

This invention relates to a circuit for deriving the quadrature components of the chroma signal present in a color television receiver.

For example, in color television receivers constructed so as to operate in response to signals presently approved by the FCC, one component of the color information is represented by one phase of the chroma signal and a second component is represented by a phase of the chroma signal that is removed by ninety degrees from or in phase quadrature with the first. It has been customary to detect these two components by separately mixing the chroma signal with quadrature phases of what is known as a color subcarrier. The circuits for deriving these quadrature phases are such that a slight misadjustment or a slight change in the circuit components causes a significant change in the absolute or relative phase of the subcarriers applied to the mixers. This results in a substantial error in the color components derived by the mixers and thus in the colors of the image on the screen.

Accordingly, it is an object of this invention to provide a circuit for deriving the quadrature components of the chroma signal in such manner that slight differences in adjustment or changes in the values of the circuit components do not produce significant changes in the color components derived.

A further object of this invention is to provide a circuit for quadrature phase splitting in the chroma channel that is simple and less expensive than the conventional circuitry now employed in shifting the phase of the subcarrier.

Briefly, these objectives are achieved in accordance with the principles of this invention in the following manner. The same phase of the color subcarrier is applied to each mixer. One phase of the chroma signal is applied to one mixer and a quadrature phase of the chroma signal is applied to the other mixer. Thus instead of shifting the phase of the subcarrier, the phase of the entire chroma signal is shifted. The phase shifting circuit for the chroma signal has a lower Q than the phase shifting circuit for a subcarrier system and hence adjustment is easier and changes in the values of circuit components have less effect.

The manner in which the above objectives are obtained in accordance with this invention will be better understood from the following description taken in connection with the accompanying drawings in which.

Figure 1:
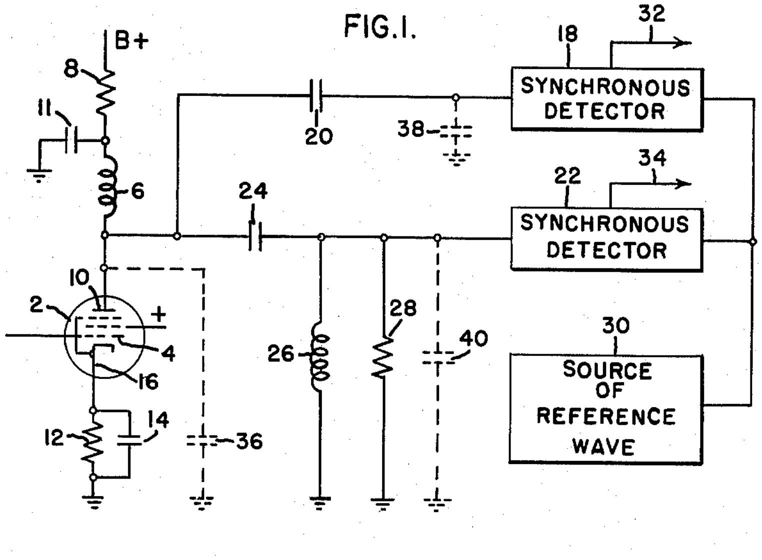
FIGURE 1 shows a circuit embodying this invention using a pi network.

Referring now to FIGURE 1, there is shown an amplifier 2 having a grid 4 to which the chroma signals are applied. A load inductance 6 and a resistor 8 for establishing the desired direct current anode voltage are connected between an anode 10 of the amplifier 2 and a source of B+ operating potential. A bypass capacitor 11 grounds the junction of the inductor 6 and the resistor 8 for signal frequencies. A bias resistor 12 and a bypass capacitor 14 are connected between a cathode 16 and ground.

The chroma signal appears in amplified form at the anode 10 and is coupled to the input terminal of a synchronous detector or mixer 18 via a coupling capacitor 20 and to the input of a synchronous detector 22 via a capacitor 24. An inductor 26 is connected between the input of the synchronous detector 22 and ground, and if required by the nature of the detector 22, a resistor 28 may be connected in parallel therewith. A single, properly selected phase of the subcarrier is coupled from a source 30 to other inputs of the synchronous detector 18 and 22, and the signals representing the desired component signals appear on the respective output leads 32 and 34.

In circuits using presently available components, there are several inherent or distributed capacitances shown in dotted lines that are used in the design as part of the circuit which are: a capacitor 36 representing the output capacitance of amplifier 2 between the anode 10 and ground, a capacitor 38 between the input to the detector 18 and ground representing the input capacitance of detector 18 and a capacitor 40 representing the input capacitance of the detector 22. It should be understood that if necessary for purposes to be discussed, actual capacitors can be connected in parallel with any or all of these inherent capacitances.

For the proper operation of the circuit, the inductance of the inductor 6 is adjusted so as to produce parallel resonance with the capacitances 36 and 38 at a frequency that is on one side of the subcarrier frequency. The inductance of the inductor 26 is adjusted so as to produce parallel resonance with the capacitance 40 at a frequency on the other side of the subcarrier frequency. These inductors and capacitors form a pi network having parallel tuned arms to ground separated by a coupling means in the form of the capacitor 24.

Figure 3:
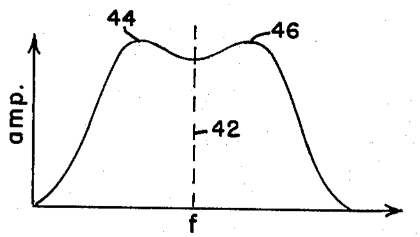
FIGURE 3 is a graph used in explaining the operation of the invention.

The overall output response of the network is illustrated in FIGURE 3 wherein the dashed vertical line 42 indicates the frequency of the subcarrier and the humps 44, 46 are produced by the two tuned inductors 6 and 26. The amount by which the amplitude of the characteristic is reduced at the subcarrier frequency 42 is determined by the value of capacitance of the capacitor 24. This capacitor also controls circuit bandwidth. The amplitude response of the circuit at the input (anode 10) is similar to that of FIGURE 3 but with broader bandwidth. When the circuit is tuned for proper symmetrical bandpass output (input to detector 22), the two tuned circuits produce a 90° phase lag of the voltage at anode 10 (applied to detector 18) compared to the signal applied to detector 22. By beating the signal at the input of the double-tuned circuit against the reference signal in detector 18, and the 90° shifted signal at the output of the double-tuned circuit against the same phase of reference signal in detector 22, the desired quadrature phased modulation components of the chroma signal are derived.

Due to the nature of double-tuned bandpass circuits, 90° phase shift results at only the center frequency of the bandpass. Bodi graphical techniques were used to estimate the effect of this error on circuit performance. This analysis proved that differential envelope delay between the primary and secondary is small at all frequencies compared to the period of one cycle of the frequency involved. This means that transient color errors produced by this circuit would be small. This was substantiated by the use of the circuit in a complete color television receiver.

The coupling network has a lower Q than in conventional reference phase splitting circuitry, accordingly, the circuit is easier to adjust so as to produce a phase shift of 90° at the subcarrier frequency, and subsequent changes in the values of components have less effect. A change in the tuning of one of the coils tends to pull the other one with it and maintain a 90° phase shift.

Figure 2:
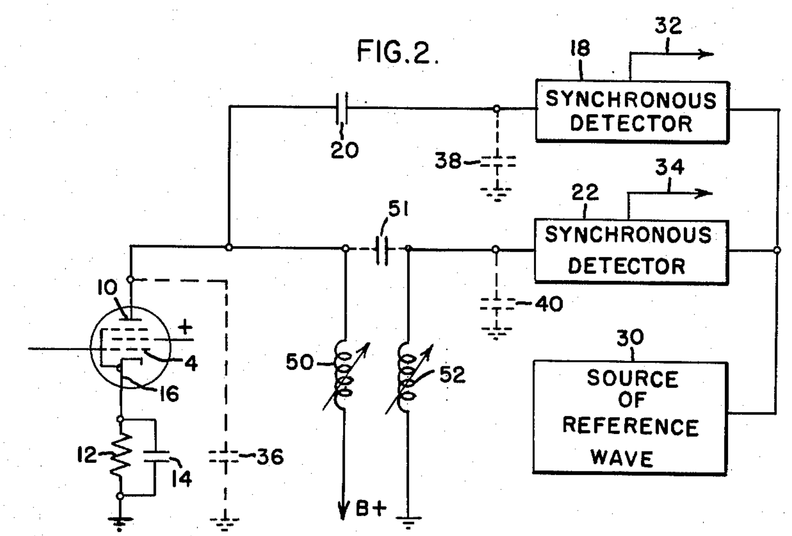
FIGURE 2 shows a circuit embodying the invention in which transformer coupling is used.

FIGURE 2 is a schematic representation of a circuit incorporating the invention in which the double-tuned bandpass filter is comprised of a transformer having a primary winding 50 that is resonated at one side of the subcarrier frequency by the capacitors 36 and 38, and also having a secondary winding 52 that is resonated on the other side of the subcarrier frequency by the capacitor 40. An inherent capacitor 51 and the mutual coupling between coils 50 and 52 control the degree of coupling. This configuration provides equivalent operation to the circuit of FIGURE 1.

In addition to the circuits of FIGURE 1 and FIGURE 2, there are other double-tuned configurations which can produce the desired chroma bandpass amplitude response and 90° phase shift. In all cases for double-tuned circuits, however, the degree of coupling should be "critical" or less than critical. If the circuit is more than critically coupled, the resulting phase shift will be less than the desired 90°. The proper 90° phase shift and amplitude response can be obtained with over-coupled circuits, but the number of tuned circuits would have to be greater than two.

The broader bandwidth at the input than at the output of the double-tuned circuit makes it advantageous to arrange the synchronous detectors and the phase of the reference signal to detect I (or R–Y) from detector 18 and Q (or B–Y) from detector 22. Once I and Q (or R–Y and B–Y) are detected, direct video matrix or other known techniques may be used to detect G–Y.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. In combination, a source having an output at which chroma signals occupying a given bandwidth, said output having a given inherent output capacitance to ground, a first synchronous detector having two inputs and an output, one of said inputs having a given input capacitance to ground, a first conductor, means for coupling said first inductor in parallel with said inherent output and input capacitances, said first inductor having an inductance of such value as to resonate with said inherent input and output capacitances at a frequency on one side of the bandwidth of the chroma signal, a second synchronous detector having two inputs and an output, one of said inputs having a given inherent capacitance to ground, a second inductor, means for coupling said second inductor in parallel with said latter inherent input capacitance, the inductance of said second inductor being of such value as to resonate with said latter inherent input capacitance at a frequency on the other side of said bandwidth, means for coupling energy corresponding to the chroma signals from said first inductor to said second inductor, a source of reference waves having a frequency in the approximate center of the bandwidth of said chroma signals, means for coupling said reference waves from said latter source to ends of the other inputs of said first and second synchronous detectors, whereby quadrature phase components of the chroma signal appear at the respective outputs of said first and second synchronous detectors.

2. In a color television receiver a circuit for deriving quadrature phase components of a chroma signal comprising a source of chroma signals having an output at which said chroma signals appear, a bandpass filter having an input and an output which provides a 90° phase shift therebetween, means for coupling the chroma signals from the output of said source to the input of said bandpass filter, a first synchronous detector having two inputs and an output, means for coupling the chroma signal appearing at said output of said source to one of said inputs of said synchronous detector, a second synchronous detector having two inputs and an output, means for coupling the chroma signals as they appear at the said output of said bandpass filter to one of said inputs of said second synchronous detector, a source of reference waves, and means for coupling the reference waves provided by said latter source to each of said other inputs of said first and second synchronous detectors so as to produce the quadrature phased components of said chroma signal at the outputs of said first and second synchronous detectors respectively.

3. The structure defined in claim 1 wherein said bandpass filter is doubly tuned and coupled in a range of less than critical coupling to and including critical coupling.

4. In a color television receiver, a circuit for deriving quadrature phase components of a chroma signal having a given bandwidth centered on the frequency of a reference wave comprising a source having an output at which the chroma signal appears, a doubly tuned bandpass filter having an input and an output and also having a bandpass frequency characteristic centered on the frequency of said reference wave, means for coupling the chroma signals from the output of said source to the input of said bandpass filter, a first synchronous detector having two inputs and an output, means for coupling the chroma signal appearing at said output of said source to one of said inputs of said synchronous detector, a second synchronous detector having two inputs and an output, means for coupling the chroma signals as they appear at said output of said bandpass filter to one of said inputs of said second synchronous detector, a source of reference waves, and means for coupling the reference wave provided by said latter source to each of said other inputs of said first and second synchronous detectors so as to produce the desired modulation components of said chroma signal at the outputs of said first and second synchronous detectors respectively.

References Cited by the Examiner

UNITED STATES PATENTS 3,023,271 2/62 Hansen -------------- 178—5.4

FOREIGN PATENTS 759,139 10/56 Great Britain.
790,407 2/58 Great Britain.

OTHER REFERENCES

Color Television Receiver Practices, Hazeltine Corp. Laboratories Staff, J. F. Rider, New York, January 9, 1956, pages 92 and 112 relied on.

DAVID G. REDINBAUGH, *Primary Examiner.*

ROY LAKE, NEWTON LOVEWELL, *Examiners.*